(12) United States Patent
Leboeuf et al.

(10) Patent No.: US 12,321,499 B2
(45) Date of Patent: Jun. 3, 2025

(54) SOFTWARE UPDATE PROTECTION SYSTEM

(71) Applicant: GM GLOBAL TECHNOLOGY OPERATIONS LLC, Detroit, MI (US)

(72) Inventors: Karl B. Leboeuf, LaSalle (CA); Brian Farrell, Troy, MI (US); Thomas M. Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 231 days.

(21) Appl. No.: 18/325,242

(22) Filed: May 30, 2023

(65) Prior Publication Data

US 2024/0403491 A1 Dec. 5, 2024

(51) Int. Cl.
*G06F 21/64* (2013.01)
*G06F 21/57* (2013.01)

(52) U.S. Cl.
CPC ............ *G06F 21/64* (2013.01); *G06F 21/575* (2013.01); *G06F 21/572* (2013.01)

(58) Field of Classification Search
CPC ........ G06F 21/60; G06F 21/64; G06F 21/572; G06F 21/575
See application file for complete search history.

(56) References Cited

U.S. PATENT DOCUMENTS

| 9,722,781 | B2* | 8/2017 | Smereka | G06F 21/572 |
| 11,356,425 | B2* | 6/2022 | Kruger | H04L 63/0435 |
| 2017/0060559 | A1* | 3/2017 | Ye | G06F 8/65 |
| 2019/0250900 | A1* | 8/2019 | Troia | G06F 8/65 |
| 2020/0089487 | A1* | 3/2020 | Ramic | G06F 8/65 |
| 2023/0394894 | A1* | 12/2023 | Cain, Jr. | B60W 50/10 |

\* cited by examiner

*Primary Examiner* — Shanto Abedin
(74) *Attorney, Agent, or Firm* — Quinn IP Law

(57) ABSTRACT

A system includes a vehicle external to a back office portal. The back office portal is operational to generate a signed update mode record. The vehicle has multiple devices and a component. The component is in communication with the devices, and operational to receive the signed update mode record, verify that the signed update mode record is from the back office portal and was created for the component, erase credentials within the component that establish the component as valid to the plurality of devices in response to the verification of the signed update mode record, perform an irreversible action within the component, enter a software update mode, exit the software update mode, and reject each request from the plurality of devices to the component that relies on the credentials that were erased from the component.

20 Claims, 4 Drawing Sheets

SOFTWARE UPDATE PROTECTION SYSTEM

INTRODUCTION

The present disclosure relates to a system and a method for software update protection.

Use of GNU General Purpose License software in electronic control unit type components within road vehicles allows users to replace the general purpose license software with versions that may have unknown behavior if operated in an originally intended environment. If the replacement software is not certified by the original equipment manufacturer for use in the electronic control units in the intended environment, unpredictable functionality may result.

Accordingly, those skilled in the art continue with research and development efforts in the field of allowing user-initiated software updates in a vehicle while protecting against unexpected behavior.

SUMMARY

A system is provided herein. The system includes a back office portal and a vehicle. The back office portal is operational to generate a signed update mode record. The vehicle is external to the back office portal. A plurality of devices are in the vehicle. The component is in the vehicle, is in communication with the plurality of devices, and is operational to receive the signed update mode record, verify that the signed update mode record is from the back office portal and was created for the component, erase credentials within the component that establish the component as valid to the plurality of devices in response to the verification of the signed update mode record, perform an irreversible action within the component, enter a software update mode, exit the software update mode, and reject each request from the plurality of devices to the component that relies on the credentials that were erased from the component.

In one or more embodiments of the system, the component is further operational to update a software item while in the software update mode. The software item prior to the update is a first operating system with a license that provides a right to modify. The software item after the update is a second operating system.

In one or more embodiments of the system, the irreversible action disables a verified boot of the second operating system.

In one or more embodiments of the system, the component is further operational to erase software within the component other than what is used to update the software item.

In one or more embodiments of the system unique identifier of the component is presented to the back office portal to request the software update mode. The back office portal is further operational to add the component to a deny list in response to the unique identifier. The deny list disables the back office portal from provisioning the credentials in the component that would allow the component to appear valid to the plurality of devices and to the back office portal.

In one or more embodiments of the system, the back office portal is further operational to verify that the unique identifier is valid, and provide the signed update mode record in response to the unique identifier being valid.

In one or more embodiments of the system, the component is set into a unique condition prior to entering the software update mode. The component is further operational to enter the software update mode in response to being in the unique condition.

In one or more embodiments of the system, the unique condition is applying an overvoltage condition to the component. The irreversible action is blowing an e-fuse within the component.

In one or more embodiments of the system, one or more functions of the vehicle that rely on the component are disabled after the component performs the irreversible action.

In one or more embodiments of the system, the credentials include a certificate and a private key used to interact with the back office portal, a crypto key used to decrypt and authenticate additional keys from the back office portal, an intra-vehicle key used to interact with the plurality of devices in the vehicle, and a mobility key used to allow mobilization of the vehicle.

A method for protection from a software update with unpredictable behavior in a vehicle is provided herein. The method includes generating a signed update mode record at a back office portal external to the vehicle, receiving the signed update mode record at a component in the vehicle, verifying within the component that the signed update mode record is from the back office portal and was created for the component, erasing one or more credentials within the component that establish the component as valid to a plurality of devices in the vehicle in response to the verification of the signed update mode record, performing an irreversible action within the component, entering the component into a software update mode, exiting the component from the software update mode, and rejecting each request from the plurality of devices to the component that relies on the credentials that were erased from the component.

In one or more embodiments, the method further includes updating a software item with the component while in the software update mode. The software item prior to the update is a first operating system with a license that provides a right to modify. The software item after the update is a second operating system.

In one or more embodiments, the method further includes disabling a verified boot of the second operating system in response to the irreversible action.

In one or more embodiments, the method further includes erasing software within the component other than what is used to update the software item.

In one or more embodiments, the method further includes presenting a unique identifier of the component to the back office portal to request the software update mode, adding the component to a deny list in the back office portal in response to the unique identifier, and disabling the back office portal from provisioning the credentials in the component on the deny list that would allow the component to appear valid to the plurality of devices and to the back office portal.

In one or more embodiments, the method further includes verifying that the unique identifier is valid in the back office portal, and providing the signed update mode record in response to the unique identifier being valid.

In one or more embodiments, the method further includes setting the component into a unique condition prior to entering the software update mode, wherein the entering of the component into the software update mode is in response to being in the unique condition.

In one or more embodiments of the method, the unique condition is applying an overvoltage condition to the component. The irreversible action is blowing an e-fuse within the component.

In one or more embodiments, the method further includes disabling one or more functions of the vehicle that rely on the component after the component performs the irreversible action.

A vehicle is provided herein. The vehicle includes a plurality of devices and a component. The component is in communication with the plurality of devices and is operational to receive a signed update mode record generated by a back office portal external to the vehicle, verify that the signed update mode record is from the back office portal and was created for the component, erase credentials within the component that establish the component as valid to the plurality of devices in response to the verification of the signed update mode record, perform an irreversible action within the component, enter a software update mode, exit the software update mode, and reject each request from the plurality of devices to the component that relies on the credentials that were erased from the component.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system and/or method for protecting against unexpected behavior in a vehicle where a vehicle user replaces a system item in a vehicle component with an uncertified version. The protection involves several techniques that ensure a component receiving the update no longer interacts within an originally intended environment and potentially cause inappropriate operations to be performed.

Figure 1:
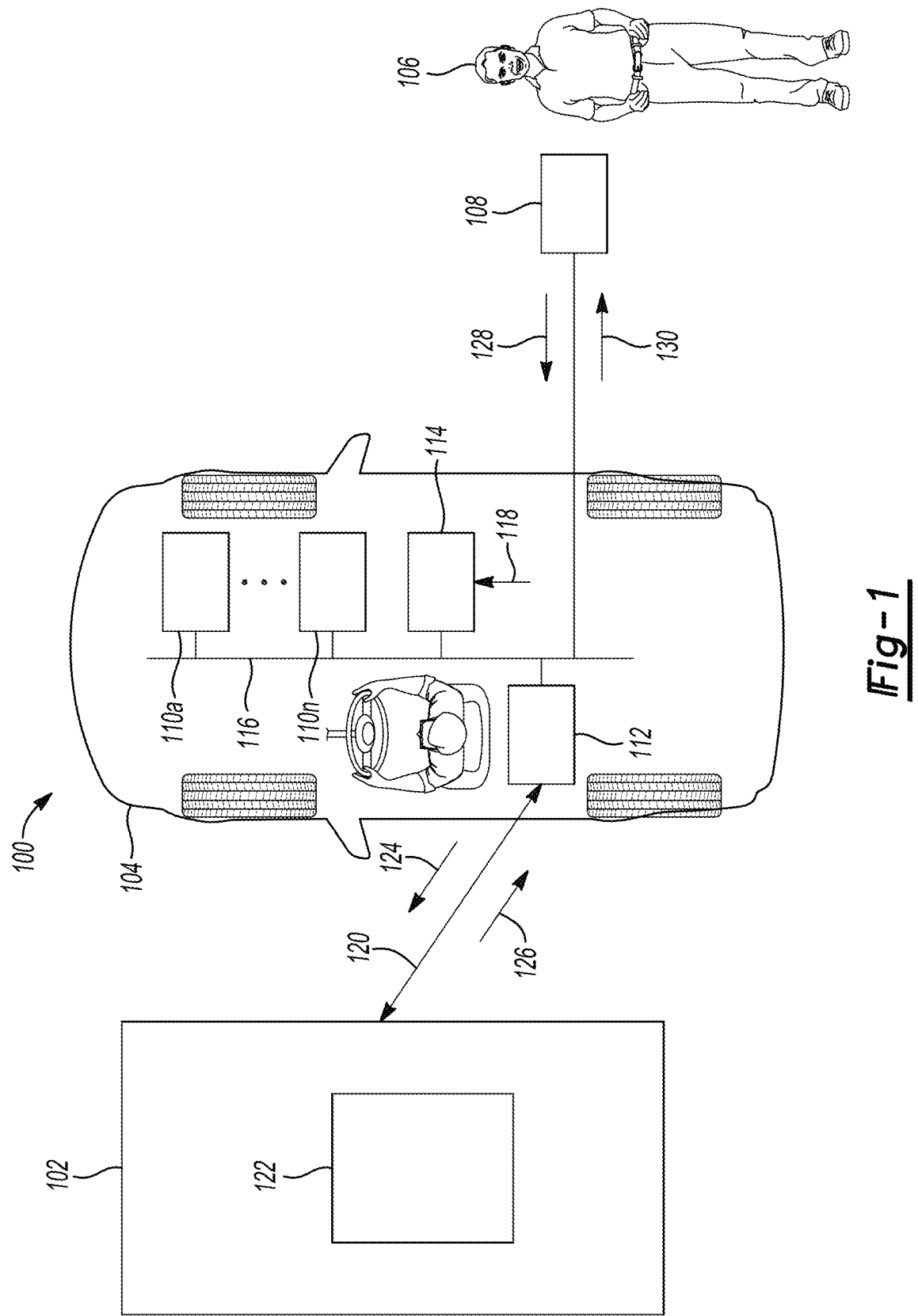
FIG. 1 is a schematic plan diagram illustrating context of a system in accordance with one or more exemplary embodiments

Referring to FIG. 1, a schematic plan diagram of an example context of a system 100 is shown in accordance with one or more exemplary embodiments. The system 100 includes a back office portal 102, a vehicle 104, a user 106, and a software loader 108. The vehicle 104 includes multiple devices 110a-110n, a transceiver 112, a component 114, and a vehicle bus 116. The component 114 may receive a signal that conveys a unique condition 118. The back office portal 102 generally includes a deny list 122. The user 106 may be in bidirectional communication with the back office portal 102 via the Internet, flash drives, cellular telephone and/or similar digital communications. The transceiver 112 is in bidirectional communication with the back office portal 102 via a wireless communication link 120. The software loader 108 is in bidirectional communication with the component 114 via the vehicle bus 116.

In various embodiments, a component identification 124 may be transferred from the component 114 to the back office portal 102 via the user 106. In other embodiments, the component identification 124 may be transferred from the component 114 through the vehicle bus 116, the transceiver 112, and the wireless communication link 120 to the back office portal 102. The component identification 124 may convey a unique component-specific identifier of the component 114. In some embodiments, a signed update mode record 126 may be transferred from the back office portal 102 to the component 114 via the user 106. In some embodiments, the signed update mode record 126 is transferred from the back office portal 102 through the wireless communications link 120, the transceiver 112, and the vehicle bus 116 to the component 114. The signed update mode record 126 generally provides authorization or denial to update the software in the component 114. An updated software item 128 may be transferred from the software loader 108 through the vehicle bus 116 to the component 114. The updated software item 128 is replacement software (e.g., a replacement or second operating system) for an existing software item (e.g., an original or first operating system) within the component 114. The component 114 may generate and send a response 130 to the software loader 108 via the vehicle bus 116. The response 130 generally indicates that the software update was either successful or unsuccessful.

The back office portal 102 implements an original equipment manufacturer (OEM) office or back office for the vehicle 104. The back office portal 102 communicates with the vehicle 104 via the wireless communication link 120. The back office portal 102 is operational to receive the component identification 124 from the user 106 or the vehicle 104, verify that the component identification 124 is valid, add the component identification 124 to the deny list 122, generate the signed update mode record 126 with the component identification 124 and software update permission if the component identification 124 is found to be valid, generate the signed update mode record 126 with the component identification 124 and software update denial if the component identification 124 is found to be invalid, and transfer the signed update mode record 126 back to the user 106 or the vehicle 104.

The vehicle 104 implements a gas-powered vehicle, an electric vehicle, a hybrid vehicle, or a plug-in hybrid vehicle. In various embodiments, the vehicle 104 may include, but is not limited to, a passenger vehicle, a truck, an autonomous vehicle, a gas-powered vehicle, an electric-powered vehicle, a hybrid vehicle, a motorcycle, a boat, and/or an aircraft. Other types of vehicles 104 may be implemented to meet the design criteria of a particular application. The vehicle 104 houses (or carries) the user 106, the devices 110a-110n, the transceiver 112, the component 114, and the vehicle bus 116.

The devices 110a-110n implement electronic control units (ECUs) and similar circuitry within the vehicle 104. The devices 110a-110n are operational to perform a variety of automotive functions within the vehicle 104. The devices 110a-110n communicate among each other via the vehicle bus 116. In some instances, one or more of the devices 110a-110n may verify that the component 114 is valid based on certificates and/or attestations exchanged with the component 114.

The transceiver 112 implements a wireless transmitter and a wireless receiver. The transceiver 112 is operational to establish communications between the vehicle 104 and the back office portal 102 via the wireless communications link 120. In various embodiments, the wireless communications link 120 may be a cellular telephone link.

The component 114 implements an electronic control unit. The component 114 communicates with the devices 110a-110n and the transceiver 112 via the vehicle bus 116. The component 114 is operational to perform multiple automotive functions that include security credentials, attestation, cryptography, and the like. The component 114 may receive a request from the user 106 via the software loader 108 to update the software, transfer the component identification 124 to the back office portal 102 via the user 106 or the transceiver 112, receive the signed update mode record 126 from the back office portal 102, and verify that the signed update mode record 126 is from the back office portal 102 and was created for the component 114.

In response to a positive verification of the signed update mode record 126, the component 114 may erase internal credentials that establish the component 114 as valid to the devices 110a-110n, and check for the unique condition 118 initiated by the user 106. Upon detection of the unique condition 118, the component 114 verifies that a System on a Chip (SOC) main domain (MD) electronic fuse is unblown and performs one or more irreversible actions within the component 114. If the MD electronic fuse is unblown, the component 114 may subsequently erase (or wipes) OEM Automotive Safety Island (SAIL) credentials and OEM MD credentials. In various embodiments, the lack of the credentials may affect the mobilization of the vehicle 104 (e.g., prevent an engine start). Thereafter, the component 114 enters a software update mode. If the MD electronic fuse is found blown, the signed update mode record 126 is not processed and the response 130 presented to the user 106 indicates an update failure.

While in the software update mode, the component 114 may receive one or more updated software items from the software loader 108, and install the updated software items (e.g., install the second operating system). After the updated software items are installed and verified, the component 114 prepares to exit the update mode.

For exiting the software update mode, the component 114 erases the OEM MD credentials and blows the MD electronic fuse. The blown MD electronic fuse disables credential usage, disables verified booting of the update software item (e.g., the second operating system provided by the user 106), and erases internal software uninvolved in the software update mode.

With the fuses blown and the credentials erased, the component 114 may reject requests from the devices 110a-110n that rely on the erased credentials. The erased credentials may include, but are not limited to one or more certificates and/or one or more private keys used to interact with the back office portal 102, one or more crypto keys used to decrypt and authenticate additional keys from the back office portal 102, one or more intra-vehicle keys used to interact with the devices 110a-110n, and one or more mobility keys used to allow mobilization of the vehicle 104.

The vehicle bus 116 implements an Ethernet-based local area network (LAN) bus, a Controller Area Network (CAN) bus, or the like. The vehicle bus 116 provides multi-directional digital communications among the devices 110a-110n, the transceiver 112, and the component 114. Other types of vehicle busses may be implemented to meet the design criteria of a particular application.

The unique condition 118 is a condition that the component 114 does not normally experience in the intended environment. In various embodiments, the unique condition 118 may be an unexpectedly high power supply voltage. In other embodiments, the unique condition 118 may be a manual switch on the component 114 set to an update position.

The wireless communications link 120 implements a radio-frequency communications channel. The wireless communications link 120 is operational to provide bidirectional digital communications between the back office portal 102 and the transceiver 112.

Figure 2:
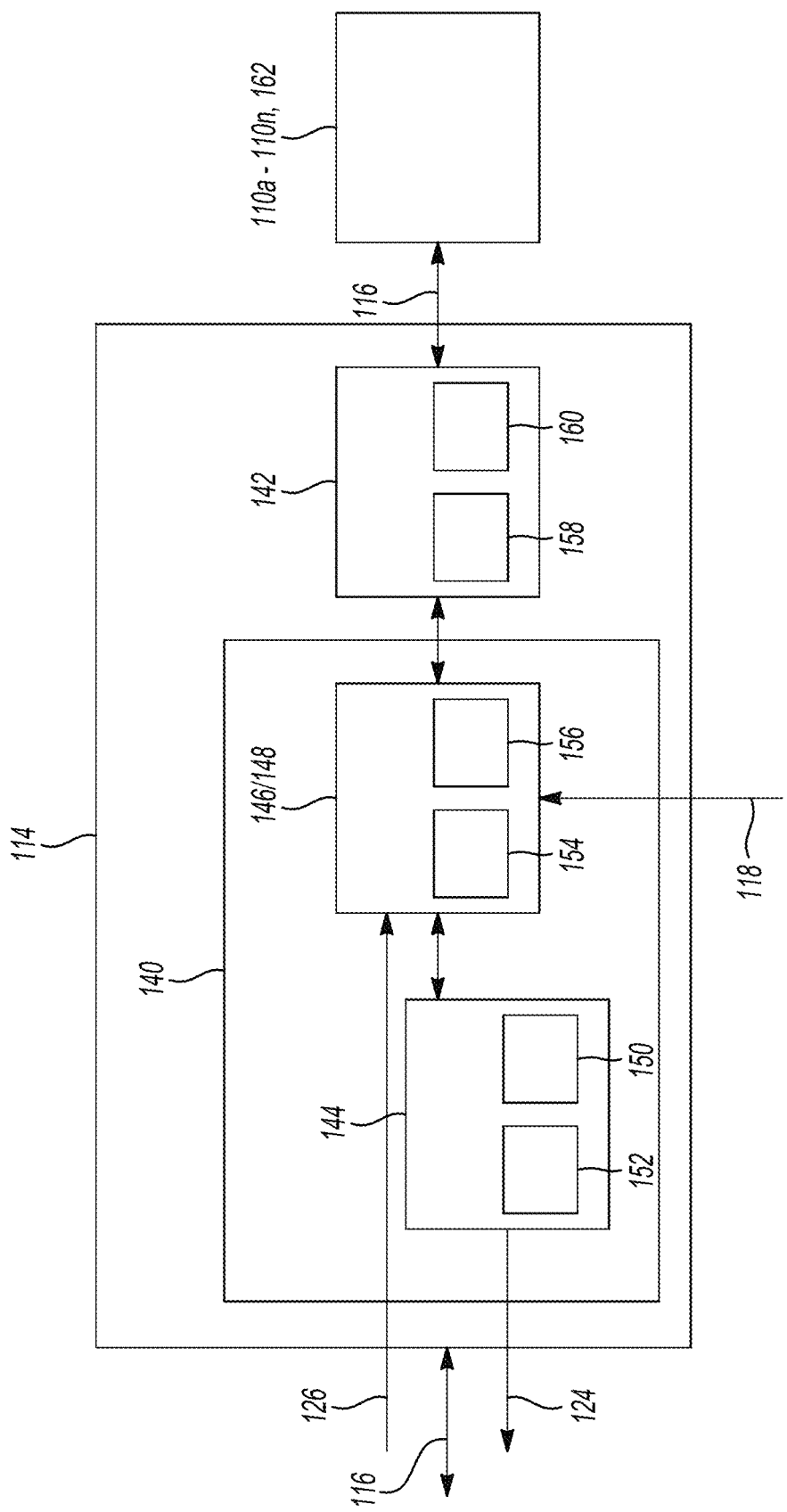
FIG. 2 is a schematic diagram of a component in accordance with one or more exemplary embodiments.

Referring to FIG. 2, a schematic diagram of an example implementation of the component 114 is shown in accordance with one or more exemplary embodiments. The component 114 may include a main domain 140 and a sub-component 142. The main domain 140 includes in-vehicle software 144 and a trusted application (TA) 146 running in a trust zone (TZ) 148. The main domain 140 may communicate with the back office portal 102 via the vehicle bus 116 and the transceiver 112. The sub-component 142 may communicate with verifiers 162 in the devices 110a-110n via the vehicle bus 116.

The sub-component 142 (or attester) includes an attester electronic fuse 158 and attester credentials 160. The sub-component 142 is responsible for attesting the validity of the component 114 to the devices 110a-110n in the intended environment. In some embodiments, the sub-component 142 may be an Automotive Safety Island (e.g., SAIL). The sub-component 142 is operational to erase the attester credentials 160 and blow the attester electronic fuse 158 to reject subsequent attestation requests.

The in-vehicle software 144 includes a first operating system 150a or a second operating system 150b, and application software 152.

The trusted application 146 includes a main domain (MD) electronic fuse 154 and original manufacturer equipment (OEM) main domain credentials 156.

The first operating system 150a implements a GPL-licensed operating system. The first operating system 150a has a GNU General Purpose License (GPL) (e.g., GPLv3) that gives the user 106 a right to modify and/or replace the first operating system 150a. Other operating systems, such as a Red-Hat In-Vehicle Operating System on Virtual Machine (RHIVOS/VM), may be implemented to meet a design criteria of a particular application.

The second operating system 150b implements a modified version of the first operating system 150a or a different operating system. The second operating system 150b is generally not certified for use in the vehicle 104 and thus may not interact with the other circuitry in the vehicle 104.

The application software 152 implements automotive functions for the vehicle 104. The application software 152 may include engine control, climate control, information control, and the like. Other software controls may be included to meet the design criteria of a particular application.

The MD electronic fuse 154 implements a one-time fuse. The MD electronic fuse 154 is associated with the main domain 140 and is blown by the trusted application 146 within the main domain 140. The trusted application 146 blowing the MD electronic fuse 154 is an irreversible action. The MD electronic fuse 154 is readable by the trusted application 146. The MD electronic fuse 154 in a normal state indicates to the trusted application 146 that the signed update mode record 126 may be processed. The MD electronic fuse 154 in a blown state indicates to the trusted application 146 that the signed update mode record 126 may be rejected.

The OEM MD credentials 156 implement credentials that the component 114 uses with the back office portal 102. The back office portal 102 may conclude that the component 114 is valid or invalid based on the OEM MD credentials 156.

The attester electronic fuse 158 implements a one-time fuse. The attester electronic fuse 158 is associated with the attestation domain and is blown by the sub-component 142

(e.g., the SAIL). The sub-component 142 blowing the attester electronic fuse 158 is an irreversible action. The attester electronic fuse 158 is readable by the sub-component 142. The attester electronic fuse 158 in a normal state indicates that attestations with the devices 110a-110n may proceed as normal. The attester electronic fuse 158 in a blown state indicates to the sub-component 142 that attestations with the devices 110a-110n are invalid.

The attester credentials 160 implement credentials that the component 114 uses with the devices 110a-110n. The devices 110a-110n may conclude that the component 114 is valid or invalid based on the attester credentials 160.

Figure 3:
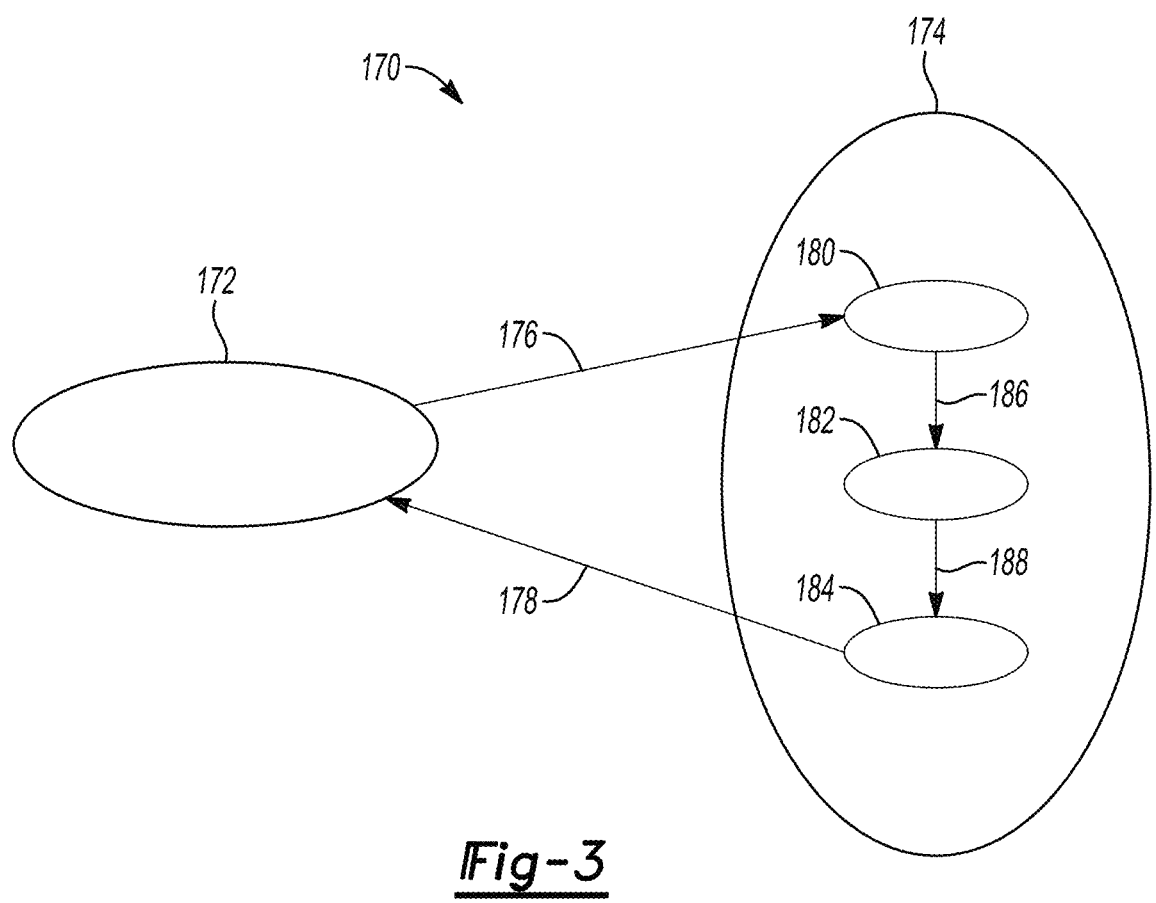
FIG. 3 is a state transition diagram for software update in accordance with one or more exemplary embodiments.

Referring to FIG. 3, with references back to FIGS. 1 and 2, an example diagram of state transitions 170 for a software update is shown in accordance with one or more exemplary embodiments. The state transitions 170 are implemented by the component 114. The state transitions 170 include a normal state 172 and an update state 174. The update state 174 includes an entry state 180, a replacement state 182, and an exit state 184. The state transitions 170 include a transition 176 from the normal state into the entry state 180. A transition 178 moves the states from the exit state 184 to the normal state 172. A transition 186 moves from the entry state 180 to the replacement state 182. A transition 188 moves from the replacement state 182 to the exit state 184.

The normal state 172 is the state of the component 114 with the first operating system 150a or the second operating system 150b. While the first operating system 150a is executing in the normal state 172, the component 114 may interact with the devices 110a-110n, the transceiver 112, the back office portal 102, and the software loader 108. While the second operating system 150b is executing in the normal state 172, the functionality of the component 114 is limited to simple functions or completely disabled. Detection of the unique condition 118 and/or reception of the software update mode record 126 may cause the transition 176 from the normal state 172 to the update state 174.

The update state 174 is the state of the component 114 while transitioning from the first operating system 150a to the second operating system 150b. The entry state 180 is used to check if the unique condition 118 is active (optional) and verifies the software update mode record 126. Upon successful verification, the transition 186 moves the state transitions 170 to the replacement state 182.

In the replacement state 182, the component 114 may replace and/or modify existing software items with the updated software item 128. The attester (OEM SAIL) credentials 160 are erased, other than the credentials used for secure communications between the trusted application 146 and the SAIL. The attester electronic fuse 158 is blown to disable attestation. The attester credentials 160 are also erased. Upon completion of the tasks, the transition 188 moves from the replacement state 182 to the exit state 184.

In the exit state 184, the OEM MD credentials 156 are erased and the MD electronic fuse 154 is blown. The blown MD electronic fuse 154 disables use of the credential and disables verified boots of the software (e.g., GPLv3 software). Status of the software update (e.g., pass/fail) may be presented to the user 106 via the software loader 108. The MD electronic fuse 154 may be readable from outside the component 114. Upon completion, the transition 178 returns the component 114 to the normal state 172 via the transition 178.

Figure 4:
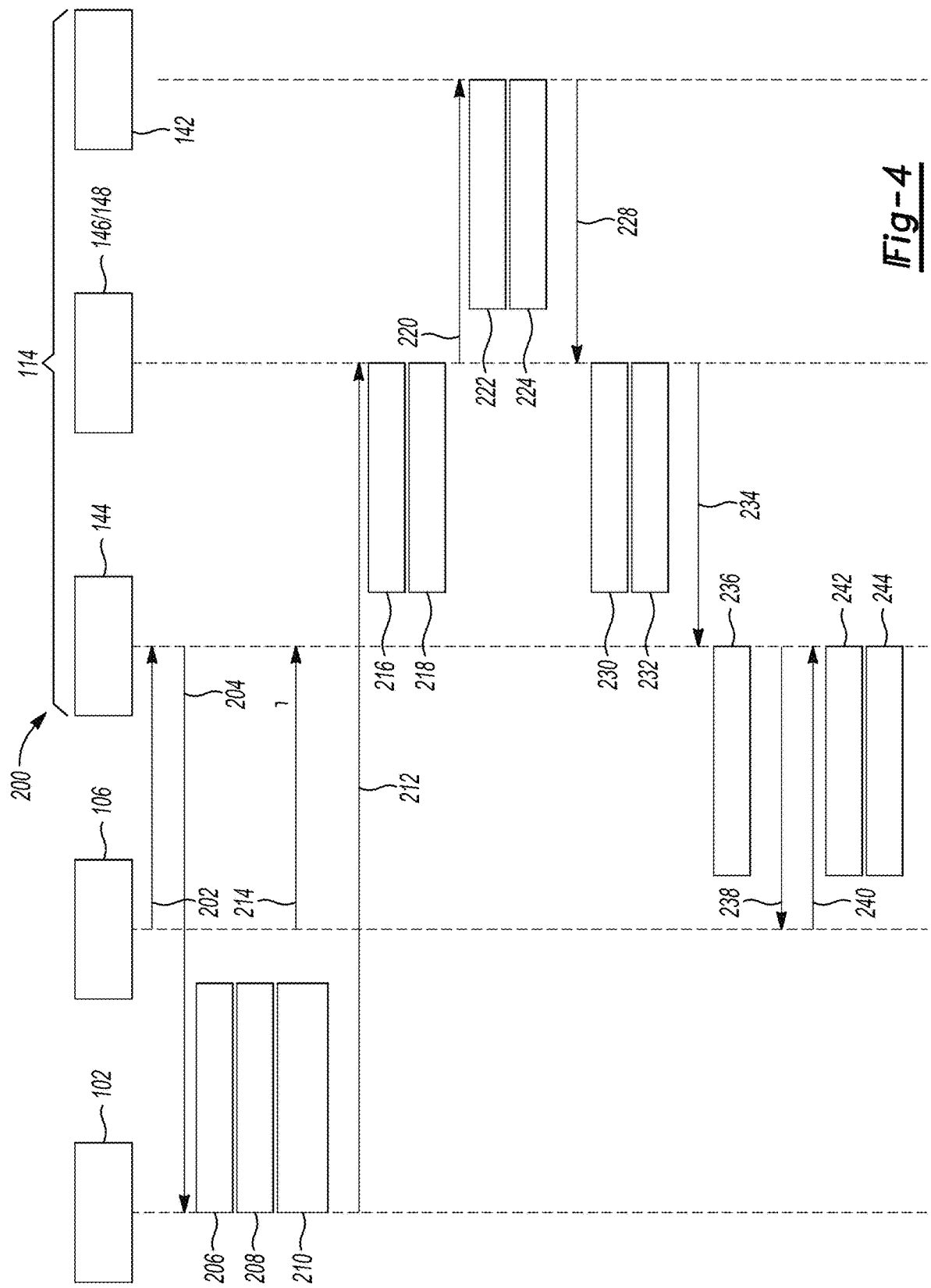
FIG. 4 is a flow diagram of a method of operation in accordance with one or more exemplary embodiments.

Referring to FIG. 4, with references to FIGS. 1 and 2, a flow diagram of an example method 200 of operation is shown in accordance with one or more exemplary embodiments. The method (or process) 200 is implemented by the system 100. The method 200 includes steps 202 to 244, as illustrated. The sequence of steps is shown as a representative example. Other step orders may be implemented to meet the criteria of a particular application.

In order to put the component 114 into the software update mode, the user 106 may instruct the component 114 in the step 202 to provide the component identification 124 to the back office portal 102 in the step 204 in order to get the signed update mode record 126 that allows the component 114 to update the GPL software items (e.g., the first operating system 150a). In various embodiments where the wireless communications link 120 is not available, the user 106 may relay the component identification 124 to the back office portal 102 by other channels.

The back office portal 102 may check if the component identification 124 is valid in the step 206 and place the component identification 124 on the deny list 122 in the step 208. The deny list 122 disables interactions of the back office portal 102 with the component 114 for provisioning of credentials used to interact with the other devices (e.g., the devices 110a-110n) in the system 100. If the component identification 124 is valid, the back office portal 102 generates the signed update mode record 126 in the step 210. In the step 212, the signed update mode record 126 is transferred back to the component 114. In various embodiments, the transfer of the signed update mode record 126 may be performed via the wireless communications link 120. In other embodiments, the transfer may be performed by the user 106. The user 106 may optionally set the unique condition 118 (e.g., an unusually high power supply voltage) for the component in the step 214.

In the step 216, the trusted application 146 checks if the unique condition 118, where implemented, is satisfied (e.g., outside of a normal operational environment). The trusted application 146 also verifies that the record came from the back office portal 102 and was created for that particular component 114 (e.g., checks the unique component identification 124) in the step 218. If the software update is valid, the trusted application 146 issues an activate update mode message to the sub-component 142 via a secure mailbox in the step 220. In the step 222, the sub-component 142 responds to the message by wiping the attester (OEM SAIL) credentials 160. The sub-component 142 also blows the attester electronic fuse 158 in the step 224 to disable attestation and use of the OEM SAIL credentials. In the step 228, the sub-component 142 echoes back to the trusted application 146 that the update mode has been activated via secure mailbox.

The trusted application 146 subsequently wipes the OEM MD credentials 156 in the step 230. In the step 232, the trusted application 146 blows the MD electronic fuse 154 to disable use of the OEM MD credentials 156 (if not previously wiped) and to disable verified boot of the second operating system 150b. The blown MD electronic fuse 154 indicates that the GPL update mode is active and that verified boot of the GPL software is thereafter skipped. If the MD electronic fuse 154 is blown, the trusted application 146 rejects requests from the virtual machines in the main domain (e.g., the in-vehicle software 144) (e.g., request to load previously exported keys, use keys to perform cryptographic functions, etc.) In the step 234, the trusted application 146 notifies the in-vehicle software 144 that the update mode was activated. The in-vehicle software 144 may wipe software items not involved in the update mode in the step 236. In the step 238, the in-vehicle software 144 generate and sends the response 130 to the user 106 via the software loader 108. The user 106 loads the software update into the component 114 in the step 240. The software update takes place in the step 242. The software update mode is exited in the step 244.

Various embodiments of the system 100 generally ensure tracking and traceability of requested signed update mode records 126 to detect suspicious behavior related to denial-of-service attacks. The system 100 ensures that a given signed update mode record 126 may not be obtained without the component 114, for which the given record is intended, being placed on the deny list 122. The deny list 122 prevents the component 114 from receiving credentials from the back office portal 102 to interact with other components in the system 100. The system 100 also ensures that prior to allowing the component 114 to have the GPL software modified, the component 114 is no longer able to affect trusted functions in the vehicle 104 by wiping the associated credentials.

In order to put a component 114 into the GPL update mode, the user 106 may initiate actions that result in a signed update mode record 126 from the back office portal 102 that takes as an input the unique component identification 124 of the component 114. The back office portal 102 verifies that the unique component identification 124 is valid and subsequently adds the component identification 124 to the deny list 122 to ensure that the component 114 is not provided keys from the back office portal 102 or other OEM back office. The lack of keys inhibit trust by other entities within the system 100. The back office portal 102 provides the signed update mode record 126 to the user 106 to provide to the component 114 or provides the signed update mode record 126 electronically to the component 114.

The trusted application 146 running in the trusted environment (e.g., TrustZone 148) within the component 114 verifies that the signed update mode record 126 came from the trusted back office portal 102 and was created for that particular component 114 (e.g., checking the unique component identification 124). Prior to enabling the software update mode, the trusted application 146 may verify that the component 114 has been removed from a normal operational environment (e.g., by checking for voltage levels that would not be present when the component 114 is installed in the vehicle 104). Prior to enabling the software update mode, the trusted application 146 wipes the credentials used to mobilize the vehicle 104. Prior to enabling the software update mode, the trusted application 146 wipes the credentials used to establish a secured channel with the back office portal 102. Prior to enabling the software update mode, the trusted application 146 wipes the credentials used to receive (e.g., decrypt and authenticate) credentials from the back office portal 102 that may cause other devices 110a-110n and 112 in the system 100 to take an unexpected action. Prior to enabling the software update mode, the trusted application 146 sends a secured request to the sub-component 142 that is responsible for device attestation (if applicable) to wipe the credentials used during attestations. Prior to enabling the software update mode, software items not used to support the update mode are wiped from the component 114. After the above steps are completed and verified, the trusted application 146 performs an irreversible action (e.g., blows a fuse) on a chip within the component 114 to indicate that the software update mode is active and that verified boot of the GPL software is to be skipped. Once the fuse for the software update mode is blown, the trusted application 146 rejects requests from the virtual machines in the main domain (e.g., the in-vehicle software 144) The refused requests may include, but are not limited to load previously exported keys, use keys to perform cryptographic functions, and the like.

Embodiments of the disclosure generally provide a system and a method for software update protection. The system includes a vehicle in communication with an external and remote back office portal. The back office portal is operational to generate a signed update mode record. The vehicle has multiple devices and a component (e.g., ECU). The component is operational to receive the signed update mode record, verify that the signed update mode record is from the back office portal and was created for the component, erase credentials within the component that establish the component as valid to the devices in response to the verification of the signed update mode record, perform an irreversible action within the component, enter a software update mode, update the software, and exit the software update mode. Thereafter, the component rejects each request from the devices that relies on the credentials that were erased during the software update.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:
1. A system comprising:
a back office portal operational to generate a signed update mode record;
a vehicle external to the back office portal;
a plurality of devices in the vehicle; and
a component in the vehicle, in communication with the plurality of devices, and operational to:
receive the signed update mode record;
verify that the signed update mode record is from the back office portal and was created for the component;
erase credentials within the component that establish the component as valid to the plurality of devices in response to the verification of the signed update mode record;
perform an irreversible action within the component, wherein one or more functions of the vehicle that rely on the component are disabled after the component performs the irreversible action;
enter a software update mode;
exit the software update mode; and
reject each request from the plurality of devices to the component that relies on the credentials that were erased from the component.

2. The system according to claim 1, wherein:
the component is further operational to update a software item while in the software update mode;
the software item prior to the update is a first operating system with a license that provides a right to modify; and
the software item after the update is a second operating system.

3. The system according to claim 2, wherein the irreversible action disables a verified boot of the second operating system.

4. The system according to claim 2, wherein the component is further operational to erase software within the component other than what is used to update the software item.

5. The system according to claim 1, wherein:
a unique identifier of the component is presented to the back office portal to request the software update mode;
the back office portal is further operational to add the component to a deny list in response to the unique identifier; and
the deny list disables the back office portal from provisioning the credentials in the component that would allow the component to appear valid to the plurality of devices and to the back office portal.

6. The system according to claim 5, wherein the back office portal is further operational to:
verify that the unique identifier is valid; and
provide the signed update mode record in response to the unique identifier being valid.

7. The system according to claim 1, wherein:
the component is set into a unique condition prior to entering the software update mode; and
the component is further operational to enter the software update mode in response to being in the unique condition.

8. The system according to claim 7, wherein:
the unique condition is applying an overvoltage condition to the component; and
the irreversible action is blowing an e-fuse within the component.

9. The system according to claim 1, wherein the credentials include:
a certificate and a private key used to interact with the back office portal;
a crypto key used to decrypt and authenticate additional keys from the back office portal;
an intra-vehicle key used to interact with the plurality of devices in the vehicle; and
a mobility key used to allow mobilization of the vehicle.

10. A method for protection from a software update with unpredictable behavior in a vehicle comprising:
generating a signed update mode record at a back office portal external to the vehicle;
receiving the signed update mode record at a component in the vehicle;
verifying within the component that the signed update mode record is from the back office portal and was created for the component;
erasing one or more credentials within the component that establish the component as valid to a plurality of devices in the vehicle in response to the verification of the signed update mode record;
performing an irreversible action within the component;
disabling one or more functions of the vehicle that rely on the component after the component performs the irreversible action;
entering the component into a software update mode;
exiting the component from the software update mode; and
rejecting each request from the plurality of devices to the component that relies on the credentials that were erased from the component.

11. The method according to claim 10, further comprising:
updating a software item with the component while in the software update mode, wherein:
the software item prior to the update is a first operating system with a license that provides a right to modify; and
the software item after the update is a second operating system.

12. The method according to claim 11, further comprising:
disabling a verified boot of the second operating system in response to the irreversible action.

13. The method according to claim 11, further comprising:
erasing software within the component other than what is used to update the software item.

14. The method according to claim 10, further comprising:
presenting a unique identifier of the component to the back office portal to request the software update mode;
adding the component to a deny list in the back office portal in response to the unique identifier; and
disabling the back office portal from provisioning the credentials in the component on the deny list that would allow the component to appear valid to the plurality of devices and to the back office portal.

15. The method according to claim 14, further comprising:
verifying that the unique identifier is valid in the back office portal; and
providing the signed update mode record in response to the unique identifier being valid.

16. The method according to claim 10, further comprising:
setting the component into a unique condition prior to entering the software update mode, wherein the entering of the component into the software update mode is in response to being in the unique condition.

17. The method according to claim 16, wherein:
the unique condition is applying an overvoltage condition to the component; and
the irreversible action is blowing an e-fuse within the component.

18. A vehicle comprising:
a plurality of devices; and
a component in communication with the plurality of devices and operational to:
receive a signed update mode record generated by a back office portal external to the vehicle;
verify that the signed update mode record is from the back office portal and was created for the component;
erase credentials within the component that establish the component as valid to the plurality of devices in response to the verification of the signed update mode record;
perform an irreversible action within the component;
disabling one or more functions of the vehicle that rely on the component after the component performs the irreversible action;

enter a software update mode;

exit the software update mode; and reject each request from the plurality of devices to the component that relies on the credentials that were erased from the component.

19. The vehicle according to claim 18, wherein:

the component is further operational to update a software item while in the software update mode;

the software item prior to the update is a first operating system with a license that provides a right to modify; and the software item after the update is a second operating system.

20. The vehicle according to claim 19, wherein the irreversible action disables a verified boot of the second operating system.

* * * * *